United States Patent
Lee

(10) Patent No.: US 11,378,384 B2
(45) Date of Patent: Jul. 5, 2022

(54) DISTANCE MEASUREMENT APPARATUS AND CONTROL METHOD THEREFOR

(71) Applicant: VC INC., Seoul (KR)

(72) Inventor: Hohyeong Lee, Seoul (KR)

(73) Assignee: VC INC., Seoul (KR)

( * ) Notice: Subject to any disclaimer, the term of this patent is extended or adjusted under 35 U.S.C. 154(b) by 167 days.

(21) Appl. No.: 16/762,232

(22) PCT Filed: Nov. 21, 2018

(86) PCT No.: PCT/KR2018/014387
§ 371 (c)(1),
(2) Date: May 7, 2020

(87) PCT Pub. No.: WO2019/103468
PCT Pub. Date: May 31, 2019

(65) Prior Publication Data
US 2020/0363190 A1 Nov. 19, 2020

(30) Foreign Application Priority Data
Nov. 22, 2017 (KR) .......................... 10-2017-0156523

(51) Int. Cl.
*A63B 69/36* (2006.01)
*G01B 11/02* (2006.01)
*A63B 71/06* (2006.01)

(52) U.S. Cl.
CPC ........ *G01B 11/026* (2013.01); *A63B 69/3605* (2020.08); *A63B 69/3655* (2013.01); *A63B 71/0622* (2013.01)

(58) Field of Classification Search
CPC ... G01B 11/026; G01B 11/26; A63B 69/3655; A63B 71/0622; A63B 2220/10;
(Continued)

(56) References Cited

U.S. PATENT DOCUMENTS 7,535,553 B2 5/2009 Vermillion et al.
7,859,650 B2 12/2010 Vermillion et al.
(Continued)

FOREIGN PATENT DOCUMENTS

CN 1981207 6/2007
CN 102445701 5/2012
(Continued)

OTHER PUBLICATIONS

SIPO, Search Report of CN 201880075115.3 dated Mar. 30, 2021.

*Primary Examiner* — Jonathan M Hansen
(74) *Attorney, Agent, or Firm* — Lex IP Meister, PLLC

(57) ABSTRACT

According to an exemplary embodiment, a distance measuring apparatus includes: a display unit and a sound output unit; a location acquiring sensor configured to acquire a current location; a slope sensor configured to measure a tilt angle; a distance measuring sensor configured to measure the straight line distance to a target; and a control unit configured to calculate a height of the target by using the tilt angle and the straight line distance, to calculate an attack distance by using a relationship between the height of the target, a landing angle, and the attack distance, and to output the attack distance to at least one of the display unit and the sound output unit.

15 Claims, 10 Drawing Sheets

(58) Field of Classification Search
CPC . A63B 2220/18; A63B 2220/20; A63B 69/36; G01C 9/02; G01D 21/02
See application file for complete search history.

(56) References Cited

U.S. PATENT DOCUMENTS

| | | | |
|---|---|---|---|
| 2005/0215338 A1 | 9/2005 | Miyamoto | |
| 2017/0010359 A1* | 1/2017 | Jung | G06F 16/444 |
| 2020/0284905 A1* | 9/2020 | Kim | G01S 17/08 |

FOREIGN PATENT DOCUMENTS

| | | |
|---|---|---|
| CN | 103777196 | 5/2014 |
| CN | 103925872 | 7/2014 |
| CN | 105547282 | 5/2016 |
| CN | 105571636 | 5/2016 |
| CN | 107367733 | 11/2017 |
| JP | 2015-150061 | 8/2015 |
| KR | 10-2004-0009499 | 1/2004 |
| KR | 10-2011-0088844 | 8/2011 |
| KR | 10-2014-0038145 | 3/2014 |
| KR | 10-2016-0109251 | 9/2016 |
| KR | 10-2016-0134383 | 11/2016 |
| WO | 2010-040219 | 4/2010 |
| WO | 2014-046438 | 3/2014 |

* cited by examiner

DISTANCE MEASUREMENT APPARATUS AND CONTROL METHOD THEREFOR

BACKGROUND OF THE INVENTION

(a) Field of the Invention

The present disclosure relates to a distance measuring apparatus and a method for controlling the same.

(b) Description of the Related Art

Golf is a sport in which a golfer hits a golf ball into a hole. A golfer determines a target point in consideration of a current location of a golf ball and a location of a hole, and selects an appropriate golf club and hits the golf ball so that the golf ball moves to the target point.

Recently, a distance measuring apparatus, etc., has been released in order to more accurately measure a distance in a field. However, even when such a distance measuring apparatus is used, it is difficult to grasp an attack distance to move the golf ball to the target point in the case where altitude of the target point (e.g. hole or green) is different from altitude of the current golf ball.

In addition, when there are obstacles such as hills and trees obstructing the field of a forward view, it is difficult for the golfer to grasp the target distance for moving the golf ball to the target point beyond the obstacles.

Eventually, the golfer guesses the attack distance by using the measured distance to the target point, and hits the golf ball using a golf club depending on the attack distance. When the golf ball is hit by a golf club appropriately corresponding to the attack distance, the golf ball may be moved to a target point existing at different altitudes or over an obstacle to the target point.

Accordingly, when the target point in the front exists at a different height from the current golf ball placement, there is a need for a method for calculating an attack distance by which the golf ball can reach to the target point and an attack distance by which the golf ball can reach to the target point beyond an obstacle even when the obstacle is present in the front.

The above information disclosed in this Background section is only for enhancement of understanding of the background of the invention and therefore it may contain information that does not form the prior art that is already known in this country to a person of ordinary skill in the art.

SUMMARY OF THE INVENTION

Technical Problem

An object of the present disclosure is to solve the aforementioned problems and other problems. Another object is to provide a distance measuring apparatus and a control method thereof for calculating an attack distance by which a golf ball can reach to a target point at a different height.

Another object is to provide a distance measuring apparatus and a control method thereof for calculating an attack distance by which a golf ball can reach to a target point beyond an obstacle.

Another object is to provide a distance measuring apparatus and a control method thereof for calculating a more accurate attack distance according to altitude of a target point.

Technical Solution

An exemplary embodiment of the invention provides a distance measuring apparatus including: a display unit and a sound output unit; a location acquiring sensor configured to acquire a current location; a slope sensor configured to measure a tilt angle; a distance measuring sensor configured to measure a straight line distance to a target; and a control unit configured to calculate a height of the target by using the tilt angle and the straight line distance, to calculate an attack distance by using a relationship between the height of the target, a landing angle, and the attack distance, and to output the attack distance to at least one of the display unit and the sound output unit.

The height of the target may be calculated by using the following equation h01=d0×sin a01, where h01 may indicate the height of the target, d0 may indicate the straight line distance, and a01 may indicate the tilt angle.

The relationship between the landing angle and the attack distance may be defined by using the following equation a0=f(X0), and a02 may indicate the landing angle and X0 may indicate the attack distance.

The attack distance may be calculated by using the following equation X0=L0+(h01+h02)÷tan a02, where h02 may be a height from a ground of the distance measuring apparatus.

The distance measuring apparatus may further include: a memory configured to store map information of golf courses; and an azimuth sensor configured to measure an azimuth, and the control unit may determine a location of an attack point by using the target distance and the azimuth, and may read an altitude of the attack point from the map information.

The control unit may calculate a compensated attack distance by using the altitude of the attack point and a compensated landing angle corresponding to the altitude of the attack point when a difference between the altitude of the attack point and an altitude of the current location is greater than or equal to a threshold.

The compensated landing angle may be calculated by using the following equation $$a23 = \tan^{-1}\frac{h23}{X22},$$

where a23 may indicate the compensated landing angle, X22 may indicate a distance value obtained by subtracting the horizontal distance to the target from the attack distance, and h23 may indicate a height value obtained by subtracting a height from altitude of the current location to the target point from a height from altitude of the current location to the target.

The compensated attack distance may be calculated by using the following equation X24=d2×cos a21+(h21+h22)÷tan a23, and X24 may indicate the compensated attack distance.

An exemplary embodiment of the invention provides a control method of a distance measuring apparatus, including: acquiring, by a location acquiring sensor, a current location of the distance measuring apparatus; measuring, by a slope sensor, a tilt angle of the distance measuring apparatus; measuring, by a distance measuring sensor, a straight line distance from the distance measuring apparatus to a target; calculating, by a control unit, a height of the target by using the tilt angle and the straight line distance; calculating, by the control unit, an attack distance by using a relationship between the height of the target, a landing angle, and the attack distance; and outputting, by the control unit, the attack distance to at least one of a display unit and a sound output unit.

The calculating a height of the target includes: calculating, by the control unit, the height of the target by using the following equation: h01=d0×sin a01, wherein h01 indicates the height of the target, d0 indicates the straight line distance, and a01 indicates the tilt angle.

The calculating an attack distance includes: calculating, by the control unit, the attack distance by using a relationship between the attack distance and the landing angle defined as a first equation a02=f(X0), and using a second equation X0=L0+(h01+h02)÷tan a02, wherein a02 indicates the landing angle, and X0 indicates the attack distance.

The control method may further include: reading, by the control unit, map information of golf courses corresponding to the current location from a memory in which the map information of the golf courses is stored; measuring, by the azimuth sensor, an azimuth of the distance measuring apparatus; determining, by the control unit, a location of an attack point by using an attack distance and the azimuth; and reading, by the control unit, an altitude of the attack point from the map information.

The control method may further include: determining, by the control unit, whether an altitude difference between the target point and the current location is greater than or equal to a threshold; and calculating, by the control unit, a compensated attack distance by using the altitude of the attack point and a compensated landing angle corresponding to the altitude of the attack point when a difference between the altitude of the attack point and an altitude of the current location is greater than or equal to a threshold.

The calculating a compensated attack distance includes: calculating, by the control unit, the compensated landing angle by using the following equation:

$$a23 = \tan^{-1}\frac{h23}{X22},$$

wherein a23 indicates the compensated landing angle, X22 indicates a distance value obtained by subtracting the horizontal distance to the target from the attack distance, and h23 indicates a height value obtained by subtracting a height from altitude of the current location to the target point from a height from altitude of the current location to the target.

wherein the calculating a compensated attack distance includes: calculating, by the control unit, the compensated attack distance by using the following equation: X24=d2× cos a21+(h21+h22)÷tan a23, wherein X24 indicates the compensated attack distance.

Advantageous Effects

The effects of the distance measuring apparatus and the control method thereof according to the present disclosure will be described as follows.

According to at least one of exemplary embodiments of the present disclosure, it is easy to check an attack distance required for a golf ball to reach a target point even when the target point is located at a different height.

According to at least one of exemplary embodiments of the present disclosure, it is easy to check an attack distance required for the golf ball to cross an obstacle even in a situation where the obstacle is positioned in front of the user.

The additional range of applicability of the present disclosure will become apparent from the following detailed description. However, since various modifications and alternatives within the spirit and scope of the present disclosure may be clearly understood by those skilled in the art, it is to be understood that a detailed description and a specific exemplary embodiment of the present invention are provided only by way of example.

DETAILED DESCRIPTION OF THE EMBODIMENTS

Figure 1:
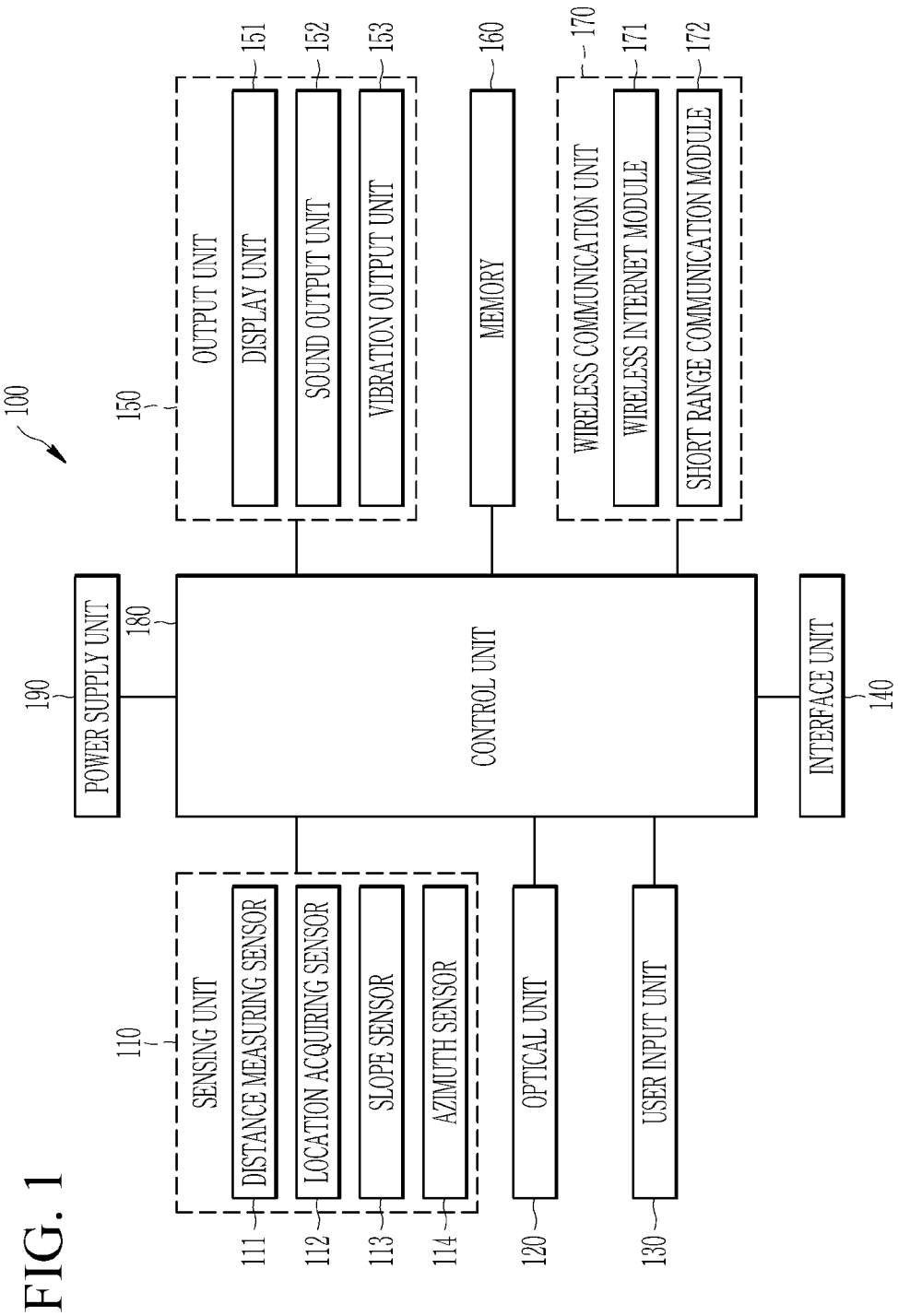
FIG. 1 illustrates a block diagram for describing a distance measuring apparatus according to an exemplary embodiment.

Hereinafter, exemplary embodiments disclosed in the present specification will be described in detail with reference to the accompanying drawings. In the present specification, the same or similar components will be denoted by the same or similar reference numerals, and a repeated description thereof will be omitted. Terms "module" and "unit" for components used in the following description are used only in order to easily describe the specification. Therefore, these terms do not have meanings or roles that distinguish them from each other in and of themselves. In describing exemplary embodiments of the present specification, when it is determined that a detailed description of the well-known art associated with the present invention may obscure the gist of the present invention, it will be omitted. The accompanying drawings are provided only in order to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or be connected or coupled to the other component with a further component intervening therebetween. Further, it is to be understood that when one component is referred to as being "directly connected" or "directly coupled" to another component, it may be connected or coupled directly to the other component without a further component intervening therebetween.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

Figure 2:
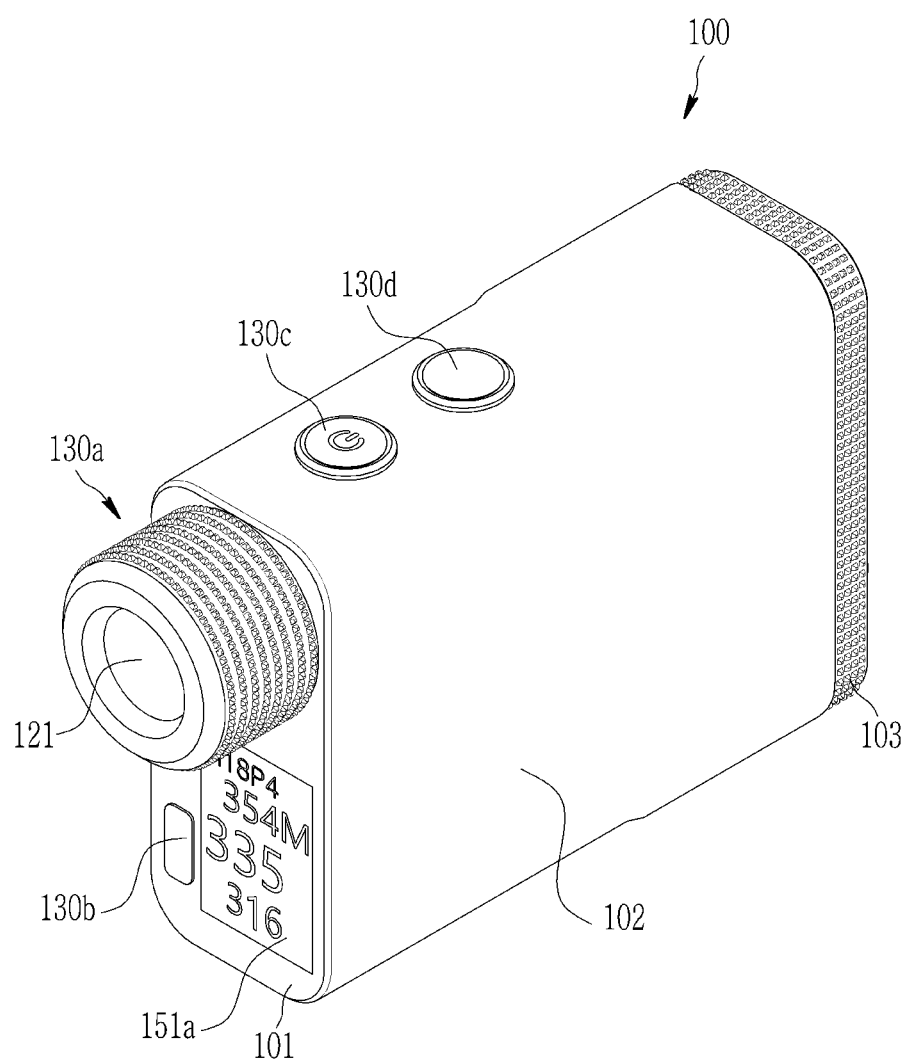
FIG. 2 and FIG. 3 illustrate schematic diagrams of examples of a distance measuring apparatus viewed in different directions according to an exemplary embodiment.
Figure 3:
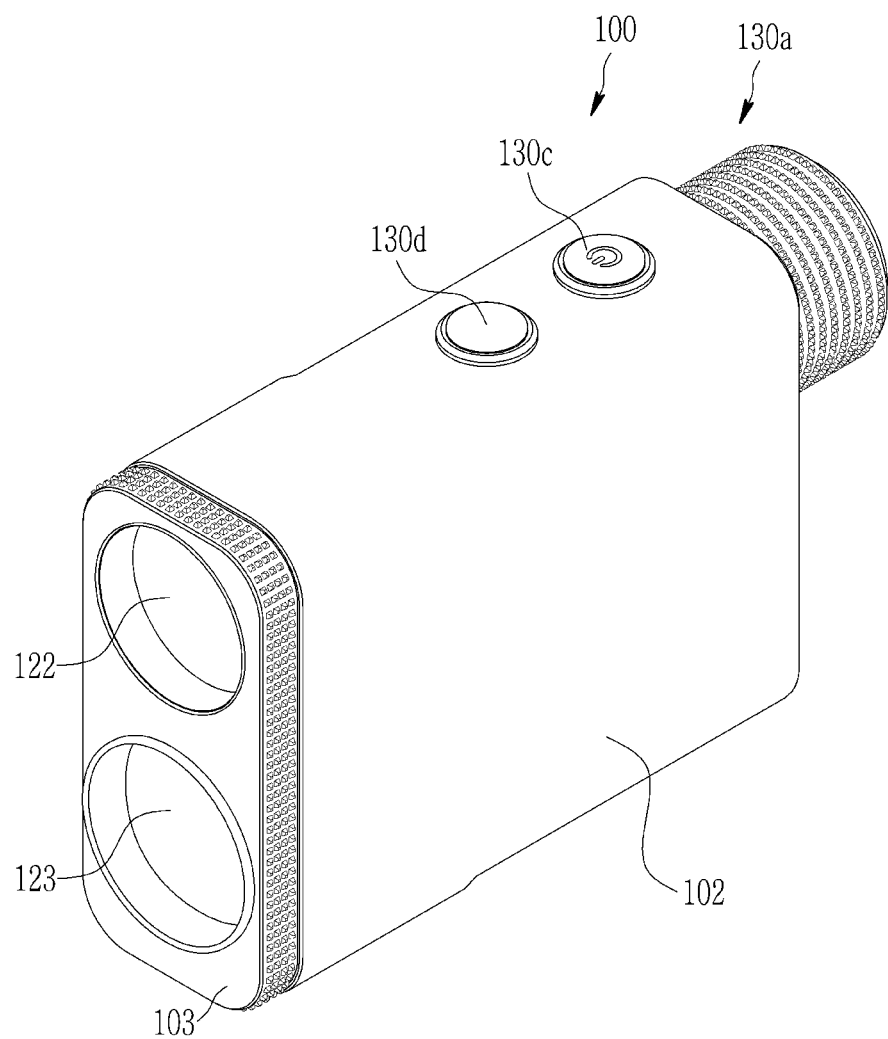

FIG. 1 illustrates a block diagram for describing a distance measuring apparatus 100 according to an exemplary embodiment, and FIG. 2 and FIG. 3 illustrate schematic diagrams of examples of the distance measuring apparatus 100 viewed in different directions according to an exemplary embodiment.

The distance measuring apparatus 100 may include a sensing unit 110, an optical unit 120, a user input unit 130, an interface unit 140, an output unit 150, a memory 160, a wireless communication unit 170, a control unit 180, a power supply unit 190, and the like. The constituent elements shown in FIG. 1 are not essential for implementing the distance measuring apparatus 100, so the distance measuring apparatus 100 described in the present specification may include more or less constituent elements than the foregoing listed constituent elements.

More particularly, among the constituent elements, the sensing unit 110 may include one or more sensors for sensing at least one of information on an environment surrounding the distance measuring apparatus 100 and information within the distance measuring apparatus 100. For example, the sensing unit 110 may include at least one of a distance measuring sensor 111, a location acquiring sensor 112, a slope sensor 113, an azimuth sensor 114, an air pressure sensor 115, a gyroscope sensor, a battery gauge, and an environment sensor (e.g., a hygrometer or a thermometer). In the meantime, the distance measuring apparatus 100 disclosed in the present specification may utilize a combination of information sensed by at least two or more sensors among the sensors.

First, the distance measuring sensor 111 refers to a sensor which measures a distance to a target. The distance measuring sensor 111 may include an ultrasonic sensor, an infrared sensor (IR sensor), a laser sensor, a radio detecting and ranging sensor (radar sensor), an optical sensor (for example, a camera), and the like. The distance measuring sensor 111 is not limited to the listed kinds of sensors, and includes all kinds of sensors measuring a distance to a target.

Hereinafter, it is assumed that the distance measuring sensor 111 is a laser sensor, which transmits a laser in a front direction and receives a laser reflected from a target to measure a distance to the target.

The location acquiring sensor 112 is a sensor for acquiring a location of the distance measuring apparatus 100, and a representative example of the location acquiring sensor 112 is a global positioning system (GPS) sensor. The GPS sensor calculates distance information from three or more separate satellites and accurate time information and then applies trigonometry to the calculated information, thereby accurately calculating 3D current location information according to the latitude, the longitude, and the altitude. Currently, a method of calculating location and time information by using three satellites and correcting errors of the calculated location and time information by using one other satellite is widely used. Further, the GPS sensor may calculate speed information by continuously calculating a current location in real time.

The slope sensor 113 may acquire the degree of tilt of the distance measuring apparatus 100. The slope sensor 113 may include an acceleration sensor (accelerometer) measuring gravitational acceleration. Further, the slope sensor 113 may also be implemented by a scheme of calculating a tilt by using a rotation angle in a vertical direction from a predetermined reference direction acquired by a gyro sensor, and the like.

The azimuth sensor 114 is a sensor measuring an azimuth, and may acquire a value of an azimuth to which the distance measuring apparatus 100 is directed. The azimuth sensor 114 may be a geomagnetic sensor, which detects the earth's magnetic field and measures an azimuth. Further, the azimuth sensor 114 may also be implemented by a scheme of calculating a tilt by using a rotation angle in a horizontal direction from a predetermined reference direction acquired by a gyro sensor, and the like.

The air pressure sensor 115 may measure air pressure at the current location, that is, atmospheric pressure.

The optical unit 120 has a structure for receiving external light, and may include a lens unit, a filter unit, and the like. The optical unit 120 optically processes light from a subject.

The lens unit may include a zoom lens, a focusing lens, a compensating lens, and the like, and the filter unit may include an ultraviolet filter (UV filter), an optical low pass filter, and the like.

Next, the user input unit 130 receives input of information from a user, and when information is input through the user input unit 130, the control unit 180 may control an operation of the distance measuring apparatus 100 so as to correspond to the input information. The user input unit 130 may include a mechanical input means (for example, a mechanical key, a button located on a front surface, a rear surface, or a lateral surface of the distance measuring apparatus 100, a dome switch, a jog wheel, and a jog switch) and a touch-type input means. For example, the touch-type input means may be formed of a virtual key, a soft key, or a visual key displayed on a touch screen through software processing, or a touch key disposed in a portion other than the touch screen. In the meantime, the virtual key or the visual key may be displayed on the touch screen with various forms, and for example, the virtual key or the visual key may be formed of graphics, text, an icon, a video, or a combination thereof.

The interface unit 140 serves as a passage of various kinds of external devices connected with the distance measuring apparatus 100. The interface unit 140 may include at least one of an external charger port, a wired/wireless data port, and a memory 160 card port. The distance measuring apparatus 100 may perform appropriate control related to the connected external device in response to the connection of the external device to the interface unit 140.

The output unit 150 generates an output related to a visual sense, an auditory sense, or a tactile sense, and may include a display unit 151, a sound output unit 152, a vibration output unit 153, and the like.

The display unit 151 displays (outputs) information processed by the distance measuring apparatus 100. For example, the display unit 151 may display execution image information of an application program driven in the distance measuring apparatus 100, or user interface (UI) and graphical user interface (GUI) information according to the execution image information.

The display unit 151 may include at least one of a liquid crystal display (LCD), a thin film transistor-liquid crystal display (TFT LCD), an organic light-emitting diode (OLED), and an e-ink display.

In addition, two or more display units 151 may exist according to an implementation form of the distance measuring apparatus 100. In this case, the plurality of display units 151 may be disposed together on an external surface of the distance measuring apparatus 100 and in an internal portion of the distance measuring apparatus 100, or the plurality of display units 151 may be individually disposed on an external surface of the distance measuring apparatus 100 and in an internal portion of the distance measuring apparatus 100, respectively.

A display unit 151*a* disposed on the external surface of the distance measuring apparatus 100 may include a touch sensor, which detects a touch to the display unit 151*a*, so as to receive an input of a control command by a touch scheme. When a touch is input to the display unit 151*a* by using the display unit 151*a*, the touch sensor may detect the touch, and the control unit 180 may generate a control command corresponding to the touch based on the detected touch. Contents input by the touch scheme may be letters or numbers, or may be menu items indicatable or designable in various modes.

A display unit 151*b* disposed in the internal portion of the distance measuring apparatus 100 may display an image to a user through an ocular lens 121 of the distance measuring apparatus 100. The display unit 151*b* disposed in the internal portion of the distance measuring apparatus 100 includes a transparent display (or a semi-transparent display), which is directly located on an optical path of the ocular lens 121. A representative example of the transparent display is a transparent OLED (TOLED). Further, the display unit 151*b* disposed in the internal portion of the distance measuring apparatus 100 may be an opaque display, which provides an image to the optical path of the ocular lens 121 through an optical member having a function of refracting or reflecting light and the like.

The sound output unit 152 may output audio data stored in the memory 160 in the form of a sound, and may be implemented in the form of a loudspeaker, which outputs various alarm sounds or a playback sound of multimedia.

The vibration output unit 153 generates various tactile effects that the user may feel. Intensity, a pattern, and the like of the vibration generated by the vibration output unit 153 may be controlled by a selection of the user or a setting of the control unit 180. For example, the vibration output unit 153 may also combine and output different vibrations or sequentially output different vibrations.

In addition, the output unit 150 may further include a light output unit, which outputs a signal notifying of generation of an event by using light of a light source.

Further, the memory 160 stores data (for example, the data includes course map information about a tee box, a fairway, a hazard, a bunker, a rough, a green, a hole of a golf course, and the like, but is not limited thereto) supporting various functions of the distance measuring apparatus 100.

The course map information includes location information of at least one tee box, location information of a green, and information related to an altitude difference between at least one tee box and a green.

In general, at least one tee box may be positioned on one golf course. Distances between each tee box and a green are different. For example, the distance between each tee box and the green increases in the order of a front tee box, a regular tee box and a back tee box.

In the course map information, an altitude difference between any one tee box and one green and an altitude difference between each tee box in a golf course are stored. For example, the altitude difference between the front tee box and the green in a golf course is stored as −20 m, the altitude difference between the front tee box and the regular tee box is stored as +1 m, and the altitude difference between the front tee box and the back tee box is stored as +3 m.

The memory 160 may store firmware and an application program driven in the distance measuring apparatus 100, and data and commands for an operation of the distance measuring apparatus 100. At least some of the application programs may be installed in the distance measuring apparatus 100 at the time of shipment for the basic function of the distance measuring apparatus 100. Further, at least some of the application programs may be downloaded from an external server through wireless communication. In the meantime, the application program may be stored in the memory 160 and is installed in the distance measuring apparatus 100, thereby being driven so as to perform the operation (or the function) of the distance measuring apparatus 100 by the control unit 180.

The wireless communication unit 170 may include one or more modules, which are capable of establishing wireless communication between the distance measuring apparatus 100 and a wireless communication system, the distance measuring apparatus 100, and other available wireless communication devices, or the distance measuring apparatus 100 and an external server.

The wireless communication unit 170 may include a wireless Internet module 171 and a short range communication module 172.

The wireless Internet module 171 refers to a module for wireless Internet connection, and may be embedded in the distance measuring apparatus 100. The wireless Internet module 171 is configured to transmit and receive wireless signals in a communication network according to wireless Internet technologies. The wireless Internet module 171 transceives a wireless signal in a communication network according to the wireless Internet technologies. Examples of the wireless Internet technology include a Wireless Local Area Network (WLAN), Wireless Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A), and the wireless Internet module 171 transceives data according to at least one wireless Internet technology in a range including Internet technology which is not listed above.

The short range communication module 172 is for short range communication, and may support short range communication by using at least one of Bluetooth™, Radio Frequency Identification (RFID), Infrared Data Association (IrDA), Ultra Wideband (UWB), ZigBee, Near Field Communication (NFC), Wi-Fi, Wi-Fi direct, and Wireless Universal Serial Bus (USB) technologies. The short range communication module 172 may support wireless communication between the distance measuring apparatus 100 and a wireless communication system, the distance measuring apparatus 100 and a wireless communication available device, or the distance measuring apparatus 100 and a network, in which an external server is located, through a wireless area network. The wireless area network may be a wireless personal area network.

Herein, the wireless communication available device may be a wearable device (for example, a smart watch and smart glasses) which is capable of exchanging (interlocking) data with the distance measuring apparatus 100 according to the present invention. The short range communication module 172 may detect (or recognize) a wearable device which is capable of communicating with the distance measuring apparatus 100, around the distance measuring apparatus 100. Further, when the detected wearable device is a device authenticated to communicate with the distance measuring apparatus 100 according to the exemplary embodiment, the control unit 180 may transmit at least a part of the data processed in the distance measuring apparatus 100 to the wearable device through the short range communication module 172. Accordingly, a user of the wearable device may use the data processed in the distance measuring apparatus 100 through the wearable device.

The control unit 180 generally controls an overall operation of the distance measuring apparatus 100 in addition to the operation related to the application program. The control unit 180 processes the input or output signal, data, information, and the like, or drives the application program stored in the memory 160 through the foregoing constituent elements, thereby providing the user with or processing the appropriate information or function.

Further, the control unit 180 may control at least a part of the constituent elements described with reference to FIG. 1 in order to drive the application program stored in the memory 160. Further, the control unit 180 may combine two or more of the constituent elements included in the distance measuring apparatus 100, and operate the combined constituent elements for driving the application program.

The power supply unit 190 receives power from an external power source and an internal power source, and supplies the power from the power source to each constituent element included in the distance measuring apparatus 100 under the control of the control unit 180. The power supply unit 190 includes a battery, and the battery may be an embedded battery or a replaceable battery.

At least some of the constituent elements may cooperate with each other and be operated for operating, controlling, or implementing a method for controlling the distance measuring apparatus 100 according to various exemplary embodiments described below. Further, the operation, the control, or the method for controlling the distance measuring apparatus 100 may be implemented in the distance measuring apparatus 100 through driving of at least one application program stored in the memory 160.

Referring to FIGS. 2 and 3, the disclosed distance measuring apparatus 100 includes a body having the form of a column, of which a front surface and a rear surface have oval track shapes. However, the present invention is not limited thereto, and is applicable to various structures, such as a watch type, a clip type, a glasses type, or a slide type, and a swing type and a swivel type in which two or more bodies are combined to be relatively movable. The form of the body may be related to a specific type of distance measuring apparatus 100, but a description of the specific type of distance measuring apparatus 100 may be generally applied to a distance measuring apparatus 100 of other types.

Herein, the body may be understood as a concept of the distance measuring apparatus 100 being considered as at least one assembly.

The distance measuring apparatus 100 includes a case (for example, a frame, a housing, and a cover) configuring an exterior appearance. As shown, the distance measuring apparatus 100 may include a front case 101, a middle case 102, and a rear case 103. Various electronic components are disposed in an internal space formed by a combination of the front case 101, the middle case 102, and the rear case 103.

The cases may be formed by injecting a synthetic resin or may be formed of a metal, e.g., stainless steel (STS), aluminum (Al), and titanium (Ti), and external portions of the cases may also be covered with leather, rubber, and the like.

An ocular lens 121, a first operation unit 130*a*, a second operation unit 130*b*, and a display unit 151*a* may be disposed in the front case 101. In this case, the first operation unit 130*a* may be disposed in the form of a jog wheel in a circumference of the ocular lens 121, thereby protecting the ocular lens 121.

A third operation unit 130*c* and a fourth operation unit 130*d* may be disposed on one surface of the middle case 102. The user may conveniently operate the third operation unit 130*c* and the fourth operation unit 130*d* while holding the distance measuring apparatus 100.

One or more object lens 122 and 123 may be disposed in the rear case 103. The object lens 122 and 123 may receive light from the outside. For example, the object lens 122 located at the upper side may receive light from a subject to enable the user to check the subject by eye through the ocular lens 121. When the laser emitted from the distance measuring apparatus 100 is reflected from the target, the object lens 123 located at the lower side may receive the reflected laser.

The configurations are not limited to the foregoing disposition. The configurations may be excluded or replaced as necessary, or may be disposed in other surfaces. For example, the display unit 151*a* and the second operation unit 130*b* may not be provided in the front surface of the body, and the number of operation units 130*a*, 130*b*, 130*c*, and 130*d* may be changed.

Next, the optical unit 120 and the distance measuring sensor 111 of the distance measuring apparatus 100 will be described in detail with reference to FIG. 4.

Figure 4:
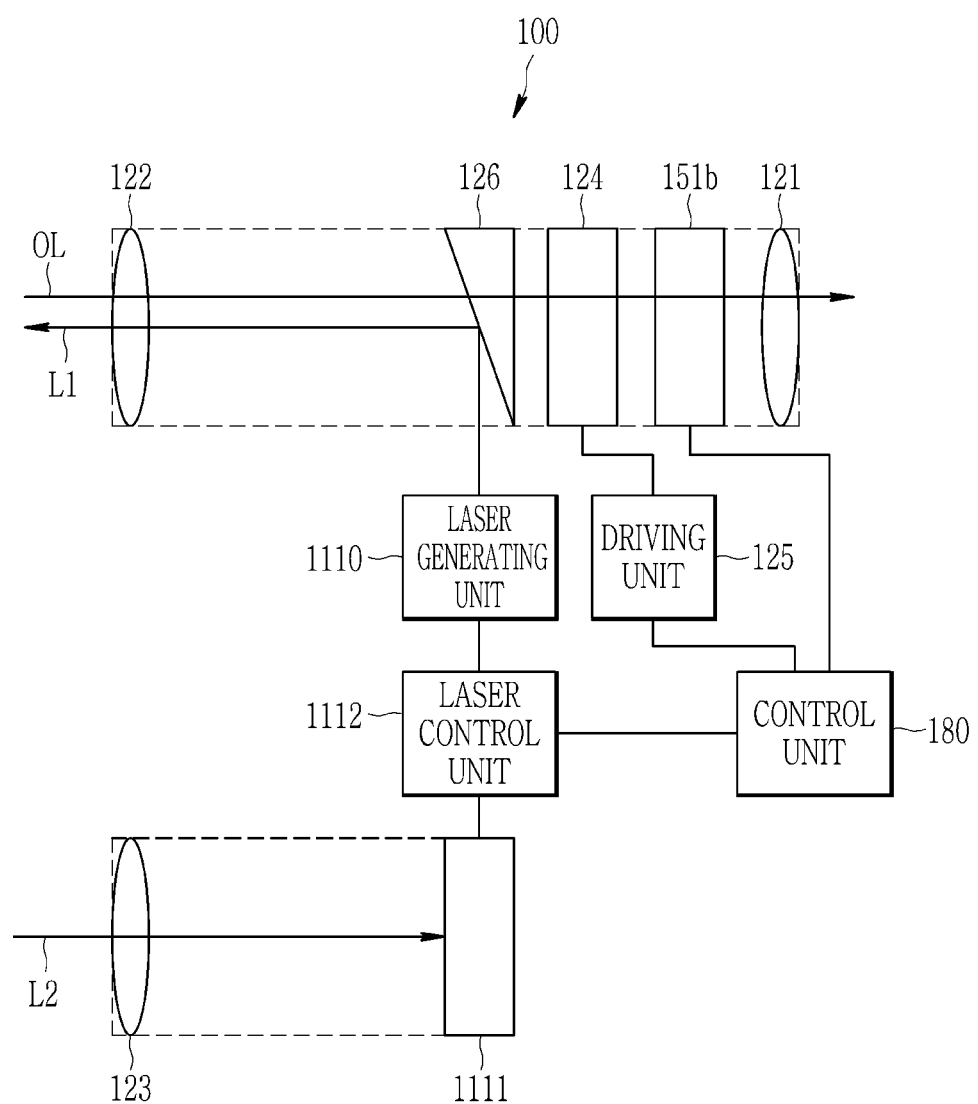
FIG. 4 illustrates a schematic structural diagram of an optical unit and a distance measuring sensor of a distance measuring apparatus according to an exemplary embodiment.

FIG. 4 is a schematic structural diagram of the optical unit 120 and the distance measuring sensor 111 of the distance measuring apparatus 100 related to one exemplary embodiment.

The distance measuring apparatus 100 according to one exemplary embodiment includes two object lens 122 and 123, one ocular lens 121, a light path changing unit 126, a light processing unit 124, the display unit 151*a*, a laser generating unit 1110, a laser receiving unit 1111, a laser control unit 1112, and the control unit 180.

Through the first object lens 122, external light OL may be incident to the distance measuring apparatus 100, or a laser L1 generated in the laser generating unit 1110 may be emitted to the outside. A path of the laser L1 generated in the laser generating unit 1110 may be changed through the light path changing unit 126 so that the laser L1 heads to the first object lens 122.

The external light OL passes through the first object lens 122 and the light path changing unit 126 to be incident to the light processing unit 124. The light processing unit 124 includes a lens unit and a filter unit. The external light OL incident to the light processing unit 124 is optically processed and heads to the ocular lens 121 side. The lens unit processes light according to the driving of a driving unit 125. For example, when the user operates the first operation unit 130a and the like, the driving unit 125 is driven and a zoom lens moves, so that a zoom-in or zoom-out operation is performed.

Through the second object lens 123, a laser L2 reflected from the target may be incident to the distance measuring apparatus 100. The laser receiving unit 1111 receives the laser L2 incident through the second object lens 123, and outputs a corresponding signal to the laser control unit 1112.

Then, the laser control unit 1112 may calculate a distance from the distance measuring apparatus 100 to the target by using the signal received from the laser receiving unit 1111. The calculated distance value is output to the control unit 180.

The display unit 151b may be formed of a transparent or semi-transparent display, and may be directly disposed in a path through which the external light OL passes. Otherwise, the display unit 151b may provide an image to the optical path of the ocular lens 121 through an optical member having a function of refracting or reflecting light and the like.

Hereinafter, a control method implementable by the distance measuring apparatus 100 formed as described above and relevant exemplary embodiments will be described with reference to the accompanying drawings. It is obvious to those skilled in the art that the present invention may be embodied in other specific forms within a range of a spirit and an essential characteristic of the present invention.

A control method of the distance measuring apparatus 100 according to a first exemplary embodiment will be described with reference to FIG. 5 to FIG. 8.

Figure 5:
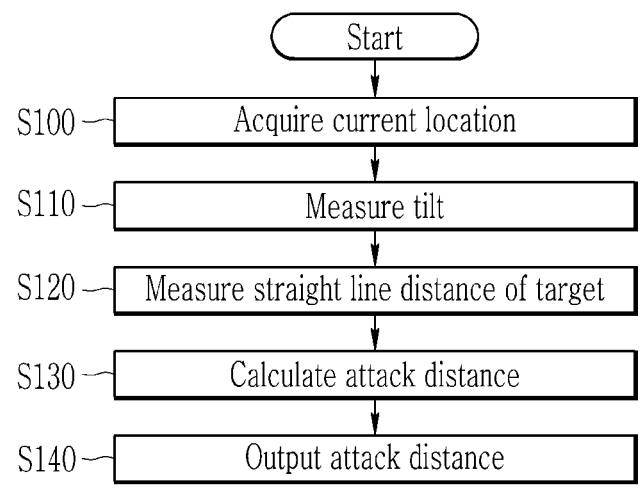
FIG. 5 illustrates a flowchart of a control method of a distance measuring apparatus according to an example of a first exemplary embodiment.
Figure 6:
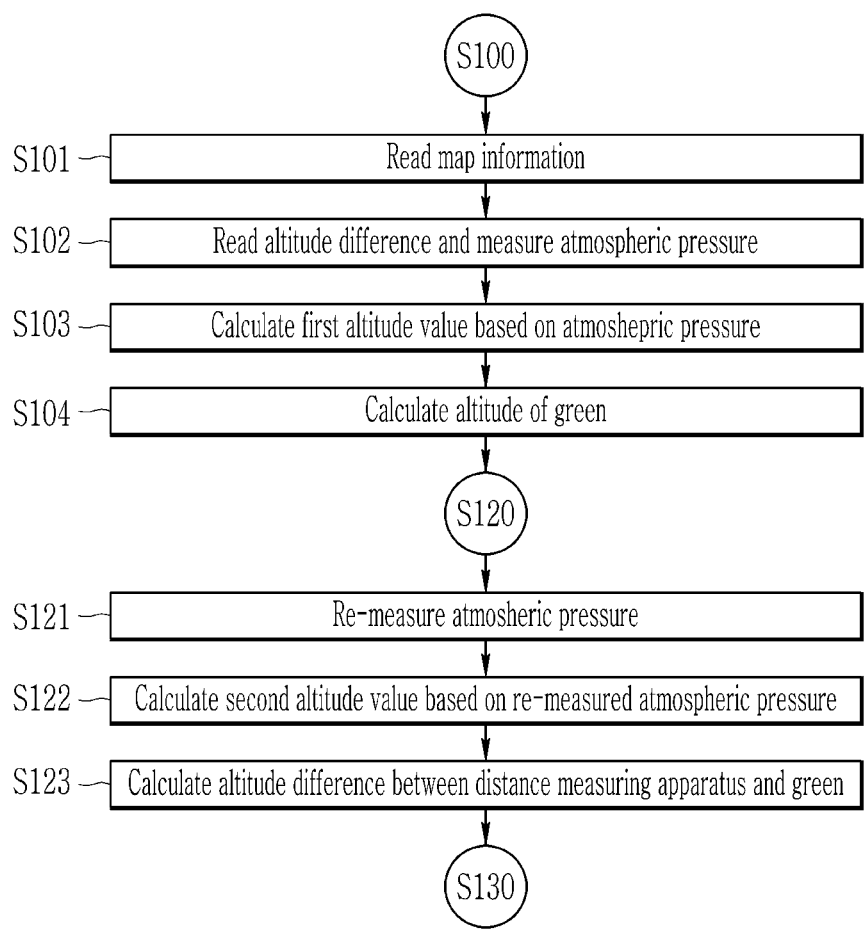
FIG. 6 illustrates a flowchart of a control method of a distance measuring apparatus according to another example of the first exemplary embodiment.
Figure 7:
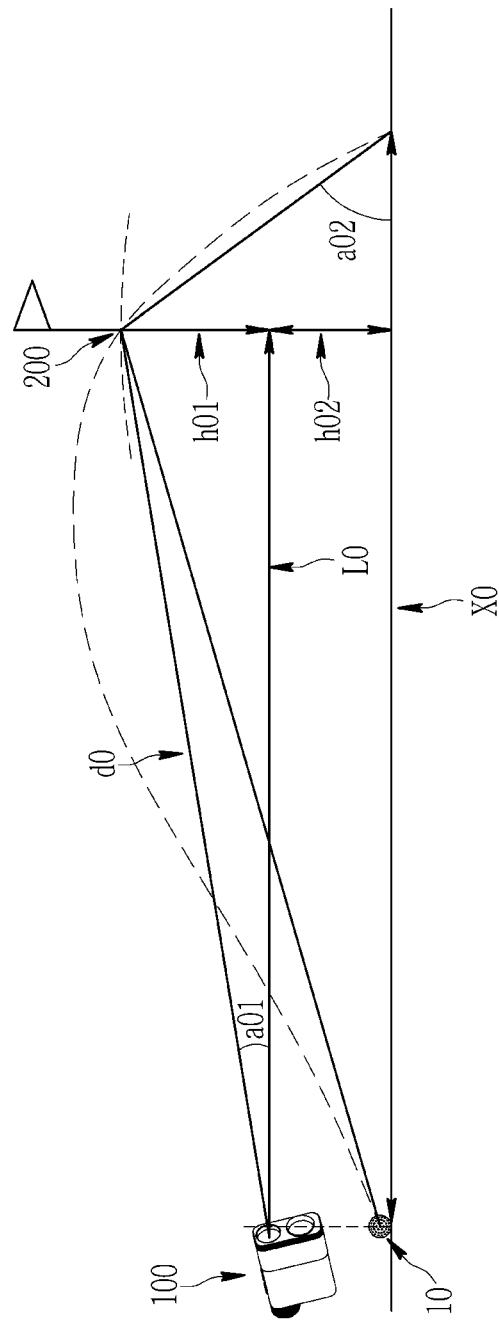
FIG. 7 and FIG. 8 illustrate examples of calculating an attack distance according to the control method of FIG. 5 and FIG. 6.
Figure 8:
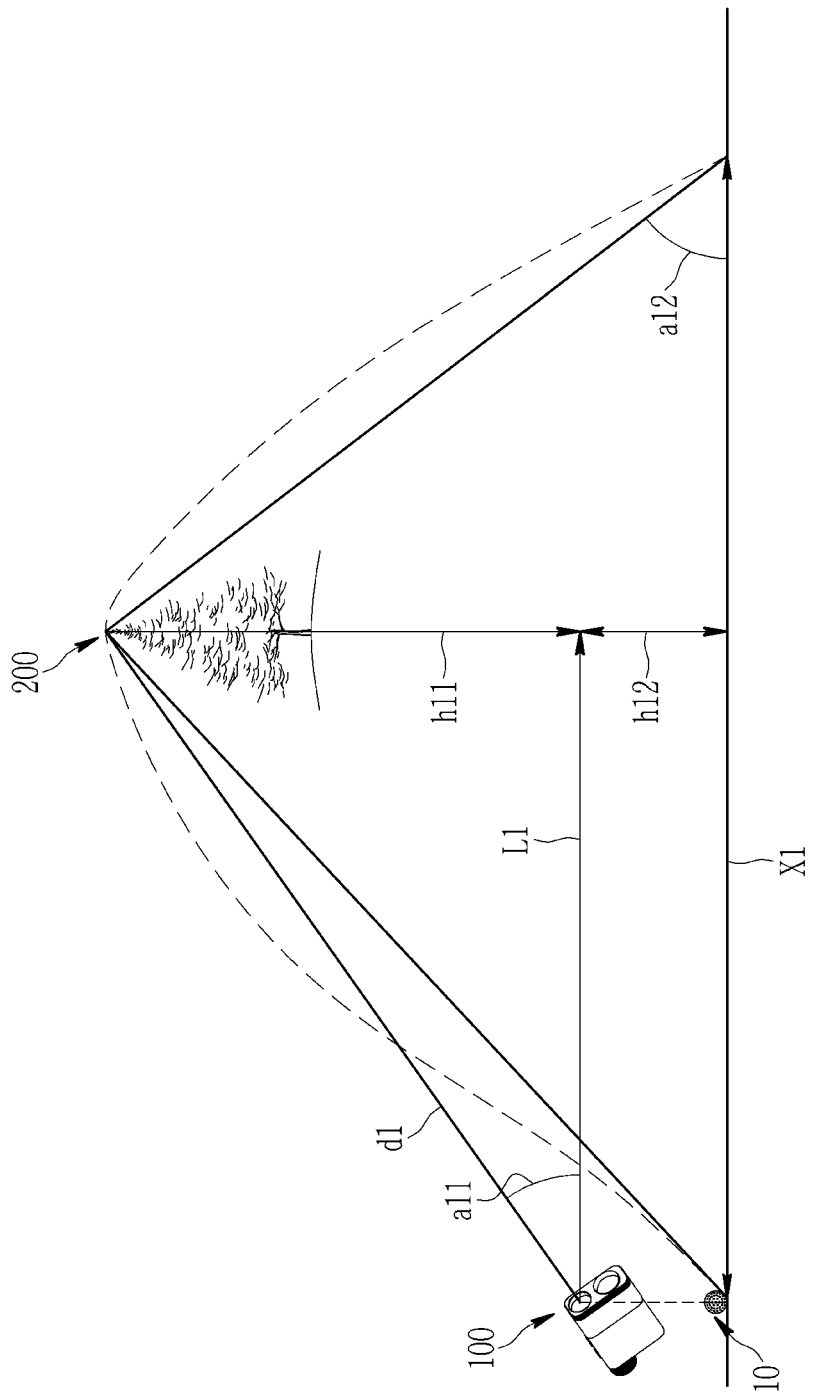

FIG. 5 illustrates a flowchart of a control method of the distance measuring apparatus 100 according to an example of a first exemplary embodiment, FIG. 6 illustrates a flowchart of a control method of the distance measuring apparatus 100 according to another example of the first exemplary embodiment, and FIG. 7 and FIG. 8 illustrate examples of calculating an attack distance in accordance with the control method according to the first exemplary embodiment.

First, this will be described with reference to FIG. 5 and FIG. 7. First, the location acquiring sensor 112 acquires a current location (S100). The location acquiring sensor 112 may acquire coordinates of the current location of the distance measuring apparatus 100. The current location may be represented by the latitude, longitude, and altitude of the distance measuring apparatus 100.

The slope sensor 113 measures an angle of tilt a01 (hereinafter referred to as a tilt angle) in which the distance measuring apparatus 100 is directed to the target (S110).

The distance measuring sensor 111 measures a straight line distance d0 from the distance measuring apparatus 100 to a target 200 (S120).

As illustrated in FIG. 7, the target 200 may be a hole at a different height from the current location. Alternatively, the target 200 may be a pin or a green installed in the hole. The target 200 is freely selectable by a user using the distance measuring apparatus 100.

Then, the control unit 180 calculates an attack distance X0 to the target 200 using the measured tilt angle a01 and the straight line distance d0 (S130).

Figure 10:
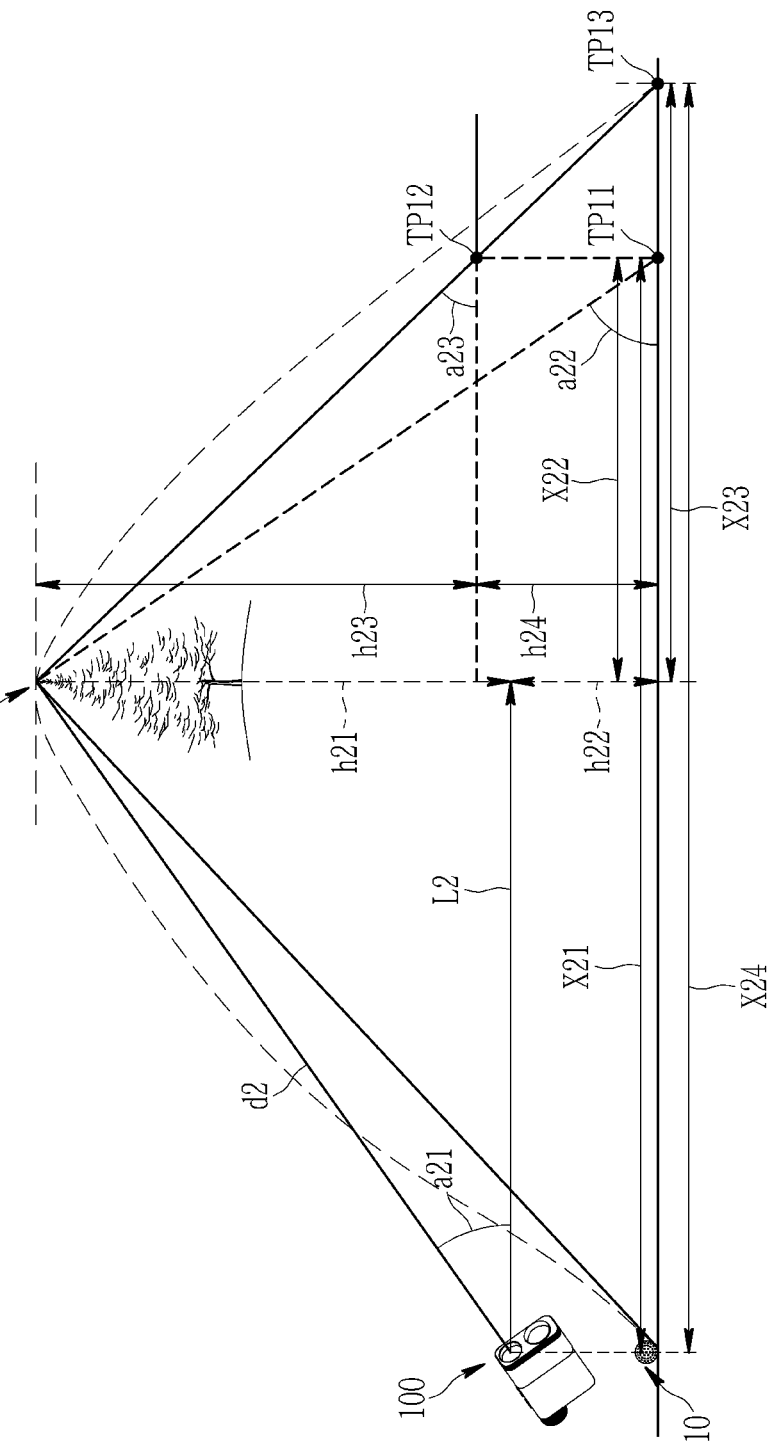
FIG. 10 illustrates examples of calculating an attack distance according to the control method of FIG. 9.

Referring to FIG. 10, in relation to the calculation of the attack distance X0, a height h01 from the distance measuring apparatus 100 to the target 200 may be calculated using Equation 1.

$$h01 = d0 \times \sin a01 \quad \text{(Equation 1)}$$

Herein, d0 indicates the straight line distance to the target 200 (distance to the target 200 measured by the distance measuring sensor 111), a01 indicates the tilt angle of the distance measuring apparatus 100, and h01 indicates a height (altitude difference) from the distance measuring apparatus 100 to the target 200.

When the height h01 is calculated, the attack distance X0 may be calculated using Equation 2 below.

$$X0 = L0(h01+h02) \div \tan a02 \quad \text{(Equation 2)}$$

Herein, X0 indicates the attack distance, L0 indicates a horizontal distance from the distance measuring apparatus 100 to the target 200, and h02 indicates a height from a golf ball 10 to the distance measuring apparatus 100. h02 may be any value that can be set by a user input. Alternatively, h02 may be a value obtained by measuring a vertical distance from the ground using the distance measuring sensor 113. When a straight line distance d0 is equal to or greater than a predetermined distance value (e.g., 150 m, etc.), h02 may be ignored in the equations.

The horizontal height L0 from the distance measuring apparatus 100 to the target 200 may be calculated using Equation 3.

$$L0 = d0 \times \cos a01 \quad \text{(Equation 3)}$$

In this case, a relationship between the attack distance X0 and a landing angle a02 of the golf ball 10 is expressed by Equation 4.

$$a02 = f(X0) \quad \text{(Equation 4)}$$

That is, the attack distance X0 and the landing angle a02 may be expressed as a function as in Equation 4, and a type of the function is not limited to a linear function, a secondary function, and the like. For example, the attack distance X0 and the landing angle a02 may be expressed as a linear function, as shown in Equation 5 below.

$$a02 = -i \times X0 + j \quad \text{(Equation 5)}$$

Herein, i and j are constant values, which may be selected by a user or the control unit 180. For example, when the user is male, i may be selected as 0.11 and j may be selected as 67, and when the user is female, i may be selected as 0.11 and j may be selected as 60. However, the i value and j value of the present invention are not limited thereto. Alternatively, the attack distance X0 and the landing angle a02 may also be expressed as a secondary function, as shown in Equation 6 below.

$$a02 = -l \times X0^2 + m \times X0 + n \quad \text{(Equation 6)}$$

Herein, L, m, and n are constant values, which may be selected by a user or the control unit 180.

Then, the control unit 180 displays the calculated attack distance X0 on the display unit 151, or outputs the attack distance X0 by voice using the sound output unit 152 (S140).

According to the control method of the distance measuring apparatus 100, even when the target point is located at a different height, it is easy to check the attack distance X0 required for the golf ball 10 to reach the target point.

Although it has been described in the above as calculating the height h01 (altitude difference) from the distance measuring device 100 to the green using Equation 1 after performing steps S110 and S120 in the case where the target 200 is a green, the control unit 180 may calculate the height h01 from the distance measuring apparatus 100 to the green using the air pressure sensor 115. This will be described with reference to FIG. 6.

FIG. 6 illustrates a flowchart of a control method of a distance measuring apparatus 100 according to another example of the first exemplary embodiment. First, when the location acquiring sensor 112 acquires a current location (S100), the control unit 180 reads course map information corresponding to coordinates of the current location from the memory 160 (S101). The control unit 180 may read course map information of a course including a nearest tee box (e.g., within 10 m) by comparing location coordinates of a front tee box, a regular tee box, and a back tee box included in the course map information with coordinates of the current location.

The control unit 180 uses location information of the tee box to read an altitude difference between the tee box and the green within a predetermined distance from the current location, and measures atmospheric pressure using the air pressure sensor 115 when a distance between the current location of the distance measuring apparatus 100 and an arbitrary tee box is within a predetermined distance (S102).

In this case, the predetermined distance may be 9 m, but the present invention is not limited thereto. When all distances between the front tee box, the regular tee box, and the back tee box from the current location are within a predetermined distance, the control unit 180 reads the altitude difference between the nearest tee box from the current location and the green.

The control unit 180 calculates a first altitude value based on the atmospheric pressure measured by the air pressure sensor 115 (S103). For example, the control unit 180 may calculate an altitude value using Equation 7 below.

$$\text{Altitude} = 44300 \cdot \left[1 - \left(\frac{\text{Pressure[Pa]}}{101325\text{[Pa]}}\right)^{\frac{1}{5.255}}\right] \quad \text{(Equation 7)}$$

An altitude value Altitude may be calculated by substituting atmospheric pressure Pressure measured by the air pressure sensor 115 into Equation 7. In addition, various methods of calculating an altitude value based on atmospheric pressure may be suggested, and the present invention is not limited to Equation 7 above.

The control unit 180 calculates an altitude value of the green by using the first altitude value calculated from the measured atmospheric pressure and the altitude difference between the nearest tee box from the current location and the green (S104).

For example, when the altitude value is calculated as 150 m in step S103, and the altitude difference between the nearest tee box from the current location and the green is read as −20 m, the altitude value of the green may be calculated as 130 m.

After a user moves within a golf course, the user may measure the straight line distance d0 to the green using the distance measuring apparatus 100 (S120). In this case, the controller 180 measures the atmospheric pressure again using the air pressure sensor 115 (S121).

The control unit 180 calculates a second altitude value based on the atmospheric pressure re-measured by the air pressure sensor 115 (S122). The control unit 180 may calculate an altitude value using Equation 7 above.

The control unit 180 calculates the altitude difference h01 between the distance measuring apparatus 100 and the green using the altitude value of the green calculated in step S104 (S123).

For example, when the altitude value of the green is calculated as 130 m in step S104 and the second altitude value is calculated as 140 m in step S122, the control unit 180 may calculate the altitude difference h01 between the distance measuring apparatus 100 and the green as 10 m.

Then, the tilt angle a01 may be calculated using Equation 1 above. That is, the distance measuring apparatus 100 may calculate the altitude difference between the current location and the target (green) without performing step S110 by using the above-described air pressure sensor 115, thereby calculating the tilt angle from the current location to the target.

Then, the control unit 180 calculates the attack distance X0 to the target 200 using the measured straight line distance d0, the calculated altitude difference h01, and the tilt angle a01 (S130).

Next, this will be described with reference to FIG. 5 and FIG. 8. The description of steps S100 and S110 is the same as that of FIG. 7, and thus it will be omitted.

In step S120, the target 200 may be a boundary portion of an obstacle positioned in front, as illustrated in FIG. 8.

In step S130, an attack distance X1 may be calculated using Equations 1 to 7 above. The attack distance X1 indicates a minimum distance that the golf ball 10 may cross the obstacle determined as the target 200.

Then, the control unit 180 displays the calculated attack distance X1 on the display unit 151, or outputs the attack distance X1 by voice using the sound output unit 152 (S140).

According to the control method of the distance measuring apparatus 100, even when there is an obstacle in front of the user, the user may easily check the target distance X1 required for the golf ball 10 to pass over the obstacle.

Next, a control method of the distance measuring apparatus 100 according to the second exemplary embodiment will be described with and reference to FIG. 9 and FIG. 10.

Figure 9:
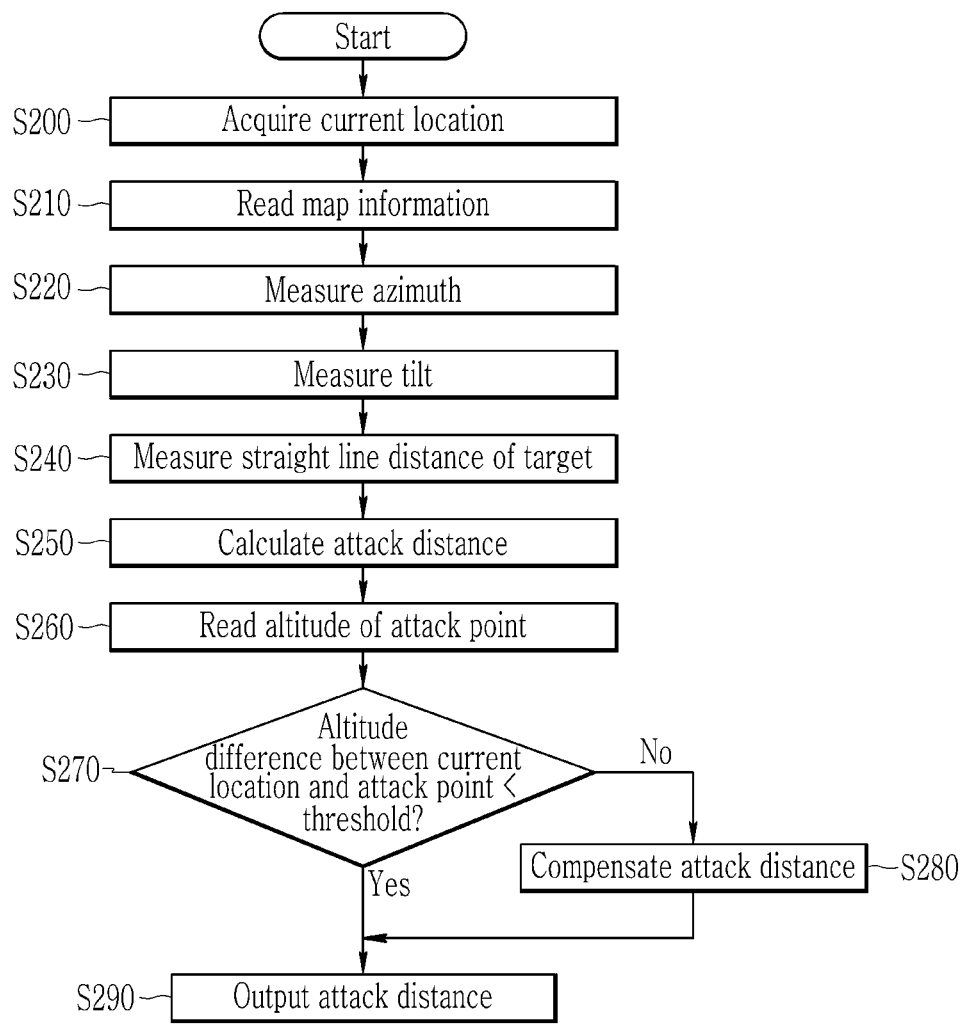
FIG. 9 illustrates a flowchart of a control method of a distance measuring apparatus according to a second exemplary embodiment.

FIG. 9 illustrates a flowchart of a control method of the distance measuring apparatus 100 according to a second exemplary embodiment, and FIG. 10 illustrates examples of calculating an attack distance according to the control method of FIG. 9.

First, the location acquiring sensor 112 acquires a current location (S200). The location acquiring sensor 112 may acquire coordinates of the current location of the distance measuring apparatus 100.

The control unit 180 reads course map information corresponding to the coordinates of the current location from the memory 160 (S210).

The azimuth sensor 114 measures an azimuth in a direction in which the distance measuring apparatus 100 is directed (S220).

The slope sensor 113 measures a tilt angle a21 of the distance measuring apparatus 100 (S230).

The distance measuring sensor 111 measures a straight line distance d2 from the distance measuring apparatus 100 to a target 200 (S240).

Then, the control unit 180 calculates an attack distance X21 to the target 200 using the measured tilt angle a21 and the straight line distance d2 (S250).

An attack distance X21 may be calculated by selectively using Equations 1 to 7 above, and detailed description will be omitted.

Next, the control unit 180 calculates coordinates of an attack point TP11 using the attack distance X21 and an azimuth, and reads altitude of the attack point TP11 using course map information (S260).

The control unit 180 determines whether a difference between the current location, that is, the altitude of the golf ball 10 and the altitude of the target point TP11, is smaller than a threshold (S270).

When the difference between the height of the golf ball 10 and the height of the attack point TP11 is greater than or equal to a threshold, the control unit 180 compensates the attack distance X21 (S280).

A compensated attack distance X34 for moving the golf ball 10 to the attack point TP12 in which the altitude read from the course map information is reflected is a distance to a virtual attack point TP13 having the same altitude as the golf ball 10. That is, the compensated distance X34 may be calculated by the control unit 180.

First, a23 may be calculated using Equation 8 below.

$$a23 = \tan^{-1} \frac{h23}{X22} \quad \text{(Equation 8)}$$

h23 may be calculated using Equation 9 below.

$$h23 = h21 + h22 - h24 \quad \text{(Equation 9)}$$

Herein, h24 may be calculated using an altitude value of the actual attack point TP12 read from the course map information and an altitude value of the current golf ball 10.

Then, the compensated target distance X24 may be calculated using Equation 10 below.

$$X24 = d2 \times \cos a21 + (h21 + h22) \div \tan a23 \quad \text{(Equation 10)}$$

Next, the control unit 180 displays the calculated attack distance X21 or X24 on the display unit 151, or outputs the attack distance X21 or X24 by voice using the sound output unit 152, when the altitude difference between the golf ball 10 and the attack point TP11 is less than a threshold (S290).

According to the distance measuring apparatus 100 and the control method of the distance measuring apparatus 100 described above, it is easy to check the attack distance to a target point even in a situation where the user cannot visually identify the attack point because of an obstacle.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A distance measuring apparatus comprising:
    a display unit configured to display information processed by the distance measuring apparatus and a sound output unit configured to output sound;
    a location acquiring sensor configured to acquire a current location;
    a slope sensor configured to measure a tilt angle;
    a distance measuring sensor configured to measure the straight line distance to a target; and
    a control unit configured to calculate a height of the target by using the tilt angle and the straight line distance, to calculate an attack distance by using the height of the target and a relationship between a landing angle and the attack distance, and to output the attack distance to at least one of the display unit and the sound output unit,
    wherein the attack distance is a distance for moving a golf ball at the current location to the target, and the landing angle is the angle at which the golf ball lands on the ground.

2. The distance measuring apparatus of claim 1, wherein the height of the target is calculated by using the following equation:

$$h01 = d0 \times \sin a01$$

wherein h01 indicates the height of the target, d0 indicates the straight line distance, and a01 indicates the tilt angle.

3. The distance measuring apparatus of claim 2, wherein a relationship between the landing angle and the attack distance is defined by following equation:

$$a02 = f(X0)$$

wherein a02 indicates the landing angle, and X0 indicates the attack distance.

4. The distance measuring apparatus of claim 3, wherein the attack distance is calculated by using equation below:

$$X0 = L0 + (h01 + h02) \div \tan a02$$

wherein h02 indicates a height from a ground of the distance measuring apparatus.

5. The distance measuring apparatus of claim 4, further comprising:
    a memory configured to store map information of golf courses; and
    an azimuth sensor configured to measure an azimuth, and the control unit determines a location of an attack point by using the target distance and the azimuth, and reads an altitude of the attack point from the map information.

6. The distance measuring apparatus of claim 5, wherein the control unit calculates a compensated attack distance by using the altitude of the attack point and a compensated landing angle corresponding to the altitude of the attack point when a difference between the altitude of the attack point and an altitude of the current location is greater than or equal to a threshold.

7. The distance measuring apparatus of claim 6, wherein the compensated landing angle is calculated by using the following equation:

$$a23 = \tan^{-1} \frac{h23}{X22}$$

wherein a23 indicates the compensated landing angle, X22 indicates a distance value obtained by subtracting the horizontal distance to the target from the attack distance, and h23 indicates a height value obtained by subtracting a height from the altitude of the current location to the target point from a height from the altitude of the current location to the target.

8. The distance measuring apparatus of claim 7, wherein the compensated attack distance is calculated by using the following equation, and X24 indicates the compensated attack distance:

$$X24 = d2 \times \cos a21 + (h21 + h22) \div \tan a23.$$

9. A control method of a distance measuring apparatus, comprising:
    acquiring, by a location acquiring sensor, a current location of the distance measuring apparatus;
    measuring, by a slope sensor, a tilt angle of the distance measuring apparatus;

measuring, by a distance measuring sensor, a straight line distance from the distance measuring apparatus to a target;

calculating, by a control unit, a height of the target by using the tilt angle and the straight line distance;

calculating, by the control unit, an attack distance by using a relationship between the height of the target, a landing angle, and the attack distance; and outputting, by the control unit, the attack distance to at least one of a display unit configured to display information processed by the distance measuring apparatus and a sound output unit configured to output sound, wherein the attack distance is a distance for moving a golf ball at the current location to the target, and the landing angle is the angle at which the golf ball lands on the ground.

10. The control method of claim 9, wherein the calculating a height of the target includes:

calculating, by the control unit, the height of the target by using the following equation:

$$h01 = d0 \times \sin a01$$

wherein h01 indicates the height of the target, d0 indicates the straight line distance, and a01 indicates the tilt angle.

11. The control method of claim 10, wherein the calculating an attack distance includes:

calculating, by the control unit, the attack distance by using a relationship between the attack distance and the landing angle defined as a first equation $a02=f(X0)$, and using a second equation $X0=L0+(h01+h02)\div\tan a02$, wherein a02 indicates the landing angle, and X0 indicates the attack distance.

12. The control method of claim 11, further comprising:

reading, by the control unit, map information of golf courses corresponding to the current location from a memory in which the map information of the golf courses is stored;

measuring, by the azimuth sensor, an azimuth of the distance measuring apparatus;

determining, by the control unit, a location of an attack point by using an attack distance and the azimuth; and reading, by the control unit, an altitude of the attack point from the map information.

13. The control method of claim 12, further comprising:

determining, by the control unit, whether an altitude difference between the target point and the current location is greater than or equal to a threshold; and calculating, by the control unit, a compensated attack distance by using the altitude of the attack point and a compensated landing angle corresponding to the altitude of the attack point when a difference between the altitude of the attack point and an altitude of the current location is greater than or equal to a threshold.

14. The control method of claim 13, wherein the calculating a compensated attack distance includes:

calculating, by the control unit, the compensated landing angle by using the following equation:

$$a23 = \tan^{-1} \frac{h23}{X22}$$

wherein a23 indicates the compensated landing angle, X22 indicates a distance value obtained by subtracting the horizontal distance to the target from the attack distance, and h23 indicates a height value obtained by subtracting a height from altitude of the current location to the target point from a height from altitude of the current location to the target.

15. The control method of claim 14, wherein the calculating a compensated attack distance includes:

calculating, by the control unit, the compensated attack distance by using the following equation:

$$X24 = d2 \times \cos a21 + (h21+h22) \div \tan a23$$

wherein X24 indicates the compensated attack distance.

* * * * *